B. WINTERS.
SWINE FEEDER.
APPLICATION FILED SEPT. 6, 1919.
1,333,787.
Patented Mar. 16, 1920.
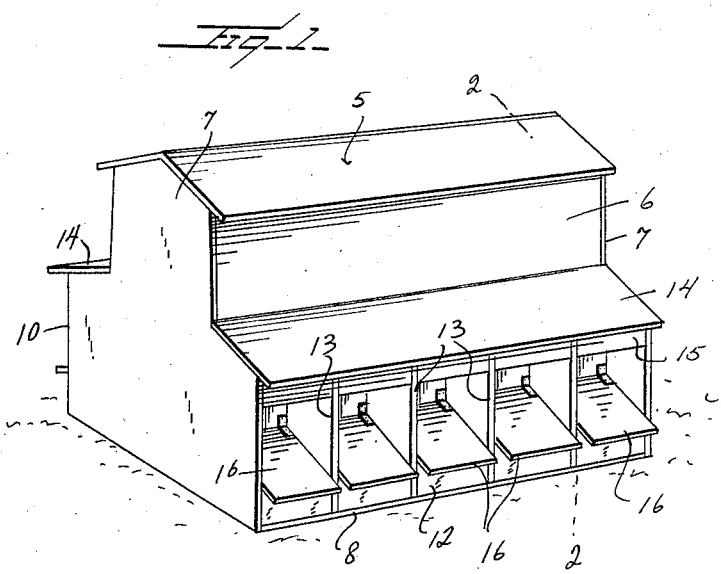
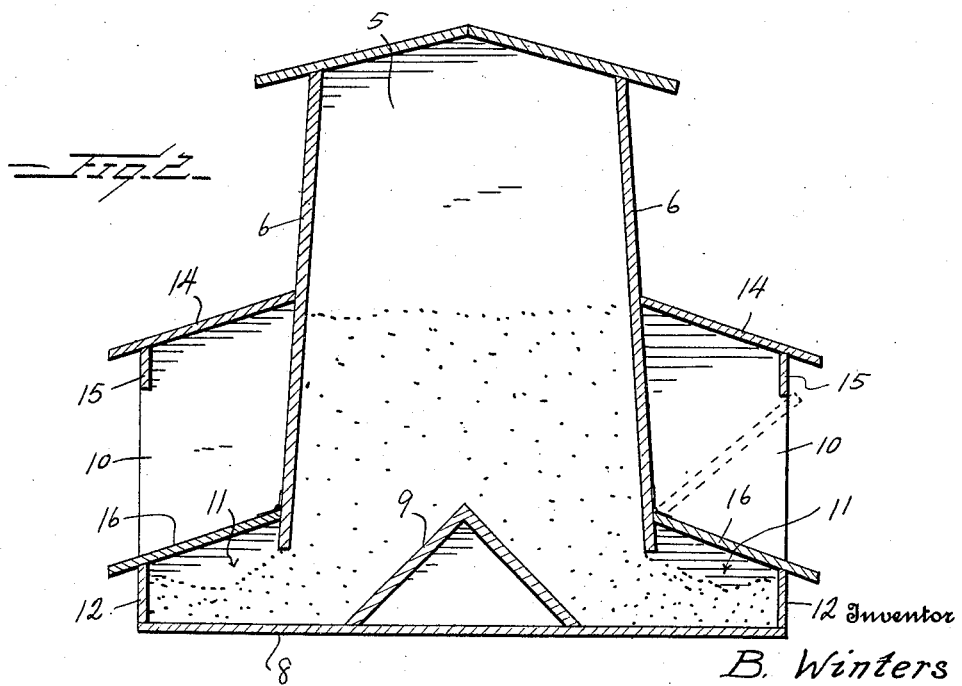
Inventor
B. Winters
By Watson E. Coleman
Attorney

UNITED STATES PATENT OFFICE.

BROOKS WINTERS, OF ADAMS, TENNESSEE.

SWINE-FEEDER.

1,333,787.  Specification of Letters Patent.  Patented Mar. 16, 1920.

Application filed September 6, 1919. Serial No. 322,213.

*To all whom it may concern:*

Be it known that I, BROOKS WINTERS, a citizen of the United States, residing at Adams, in the county of Robertson and State of Tennessee, have invented certain new and useful Improvements in Swine-Feeders, of which the following is a specification, reference being had to the accompanying drawings.

This invention relates to feeders, and particularly to that type operated by the animal and has for its object to provide a device of this character that can only be operated by swine, and prevents access to the feeder of all other live stock and poultry.

Another object of the invention is to provide a door for the feeder operated by the head of the swine, and so constructed that it closes when disengaged from the head of the swine.

These objects are attained by the mechanism illustrated in the accompanying drawing, in which:

Figure 1 is a perspective view of the feeder.

Fig. 2 is a transverse sectional view.

Referring to the drawings, 5 designates a feeder having side walls 6, end walls 7 and a bottom 8, which extends beyond the outer face of the side walls 6. Positioned centrally of the bottom 8 is a spreader 9 intended to spread the feed toward the side walls 6. The end walls 7 include extensions 10, which project beyond the outer face of the side walls 6, and coöperate with the extending portion of the bottom 8 in forming a feed trough 11.

Extending upwardly from the ends of the bottom extension is a flange 12 which constitutes the front of the trough. The lower ends of the side walls 6 terminate in spaced relation to the bottom of the feeder, so as to provide an opening through which the feed passes into the trough. Extending from the outer surface of the side walls 6 is a plurality of partitions 13, which coöperate with the end extension to form feeding chambers. Disposed over the upper portions of the end extensions and partitions is a top 14, while depending from the top is a flange 15. Hinged to the outer surface of the side walls 6 of each feeding chamber is a door 16, which is inclined downwardly from the side walls and engages and projects over the flange 12 of the trough.

In operation, the head of the swine is engaged with the projecting portion of the door 16 and is thereby raised to permit access of the head of an animal. As the door 16 is engaged with the head of the animal, there is no possible way for poultry to enter the opening as it is entirely engaged by the head of the swine. When the swine leaves the feeder, the door swings downwardly and engages the front flange of the trough and not only prevents the entrance of fowl, but prevents the entrance of dirt and the elements through the coöperation of the top 14 of the feeding chambers.

From the foregoing description, it will be readily seen that in view of the novel arrangement of the door and chambers, it is impossible for any live stock or poultry, with the exception of swine to operate or gain access to the trough. At the same time, the door can be easily operated by the swine.

What is claimed is:

A device of the character described comprising a trough, end walls extending upwardly from said trough, each end wall having an upper reduced extension, side walls supported by the end walls, the lower portions of said side walls being disposed inwardly of the side portions of the end walls and sides of the trough, the upper portion of the side walls being disposed in the plane of the edges of said extensions, a plurality of spaced partitions projecting from the outer surface of the side walls, the outer edges of the partitions being disposed in the plane of the edges of the end walls, a cover mounted on the upper portion of the end walls at the base of the extensions and extending over the front portion of the partitions, a flange depending from the cover, said flange connecting the outer edges of the partitions to each other, and to the end walls, and doors swingingly mounted on the outer surface of the side walls between the partitions and end walls, and projecting over the side walls of the trough, said depending flange preventing the door from being swung beyond the center of gravity.

In testimony whereof I hereunto affix my signature.

BROOKS WINTERS.